(12) United States Patent
Echemendia

(10) Patent No.: US 8,058,741 B1
(45) Date of Patent: Nov. 15, 2011

(54) HYDROELECTRIC POWER SYSTEM

(76) Inventor: Abel Echemendia, Palm Springs, FL (US)

( * ) Notice: Subject to any disclaimer, the term of this patent is extended or adjusted under 35 U.S.C. 154(b) by 350 days.

(21) Appl. No.: 12/471,353

(22) Filed: May 23, 2009

(51) Int. Cl.
*F03B 13/10* (2006.01)
(52) U.S. Cl. ....................................................... 290/53
(58) Field of Classification Search ............... 290/53, 290/54
See application file for complete search history.

(56) References Cited

U.S. PATENT DOCUMENTS

| 4,023,041 A * | 5/1977 | Chappell ........................ 290/53 |
| 4,443,707 A | 4/1984 | Scieri et al. |
| 4,698,516 A | 10/1987 | Thompson |
| 6,836,028 B2 | 12/2004 | Northrup et al. |
| 2007/0296285 A1* | 12/2007 | Enomoto et al. ............. 310/257 |
| 2009/0160192 A1* | 6/2009 | Chen ............................... 290/54 |
| 2010/0207394 A1* | 8/2010 | Leung ............................ 290/54 |

* cited by examiner

*Primary Examiner* — Nguyen N Hanh
(74) *Attorney, Agent, or Firm* — Donald J. Ersler

(57) ABSTRACT

A hydroelectric power system includes a plurality of paddle wheels, a plurality of electrical generators, a pumping system and a support structure. The support structure includes a water reservoir and at least one water channel contained in an inclined surface. The pumping system includes a plurality of inlet pipes and water pumps that pump water from a body of water into the water reservoir. The plurality of paddle wheels are rotatably retained along a length of the inclined surface. The paddle wheel includes tank paddles that are partially filled with water. The plurality of electrical generators are retained on the support structure. Each electrical generator includes a plurality of stator sections that are engaged or disengaged through a control device. Water in the water reservoir flows down at least one water channel and causes the plurality of paddle wheels to rotate, which causes the electrical generators to generate electricity.

16 Claims, 14 Drawing Sheets

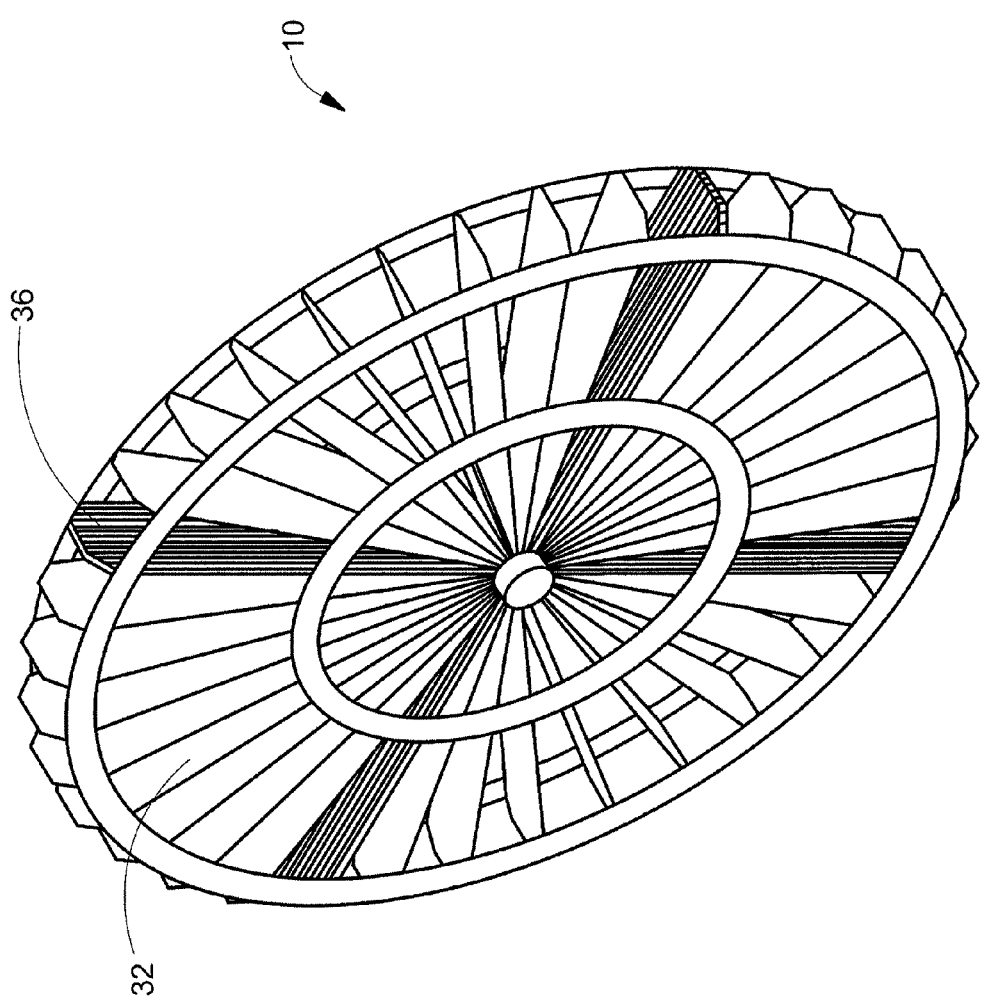

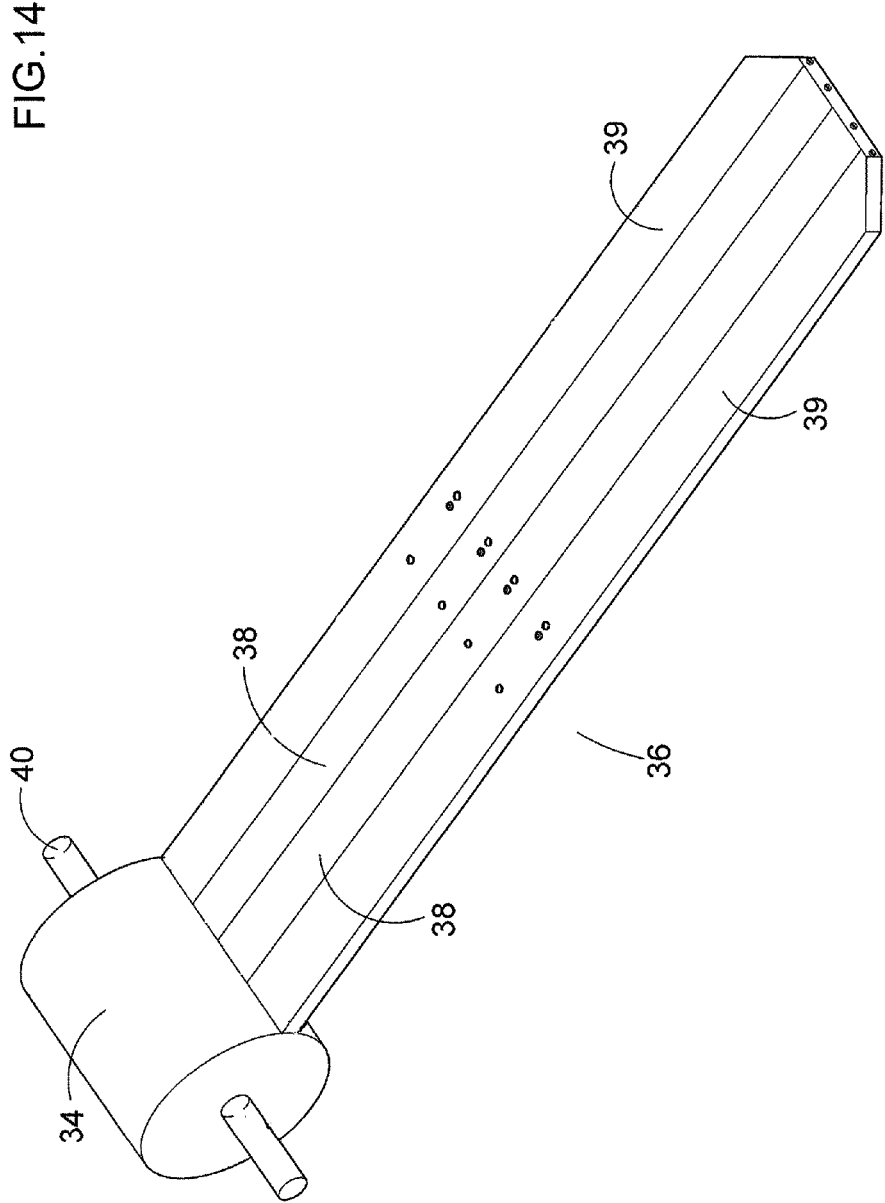

HYDROELECTRIC POWER SYSTEM

BACKGROUND OF THE INVENTION

1. Field of the Invention

The present invention relates generally to hydroelectric power generation and more specifically to a hydroelectric power system, which utilizes paddle wheels driven by water to produce electrical power.

2. Discussion of the Prior Art

U.S. Pat. No. 4,443,707 to Scieri et al. discloses a hydro electric generating system. The Scieri et al. patent includes a system to produce power by changing the potential energy of water to kinetic energy to drive a turbine, which is coaxially connected to a generator. U.S. Pat. No. 4,698,516 to Thompson discloses a hydro-electric power plant. The Thompson patent includes a power plant specifically structured to operate in connection with a water reservoir supplied from a natural body of water such as an ocean, lake, etc. and which is structured to be at least partially self-sufficient.

U.S. Pat. No. 6,836,028 to Northrup et al. discloses a segmented arc generator. The Northrup et al. patent includes a rotor having a plurality of salient poles disposed about a periphery of a rotor ring. A switching matrix selectively places the coils in series or parallel or a combination of series and parallel connections with respect to one another in response to control signals that are based on present operating conditions of the generator.

Accordingly, there is a clearly felt need in the art for a hydroelectric power system, which includes a plurality of paddle wheels driven by water and water stored in some of the paddles of the paddle wheels to produce electrical power.

SUMMARY OF THE INVENTION

The present invention provides a hydroelectric power system, which includes a plurality of paddle wheels driven by water to produce electrical power. The hydroelectric power system includes a plurality of paddle wheels, a plurality of electrical generators a pumping system and a support structure. The support structure includes at least one water channel, a water reservoir and a support base. The support base is located in or above a body of water either natural or man made. The support base includes an inclined surface. The at least one water channel is formed in the inclined surface. The water reservoir is located on a top of the inclined surface. The natural body of water could be a pond, river, lake or ocean. The man made body of water could be a holding tank or a ground reservoir. The pumping system includes a plurality of inlet pipes and water pumps. One end of each inlet pipe is located in the body of water and the other end fills the water reservoir with water.

The plurality of paddle wheels are rotatably retained along a length of the inclined surface. Each paddle wheel includes a plurality of paddles extending radially from a paddle hub. A paddle axle is inserted through the paddle hub. Some of the paddles are tank paddles that include a hollow space. Preferably, one half of the hollow space is filled with water and the other half is filled with compressed air. The paddle axle drives at least one electrical generator. Each electrical generator includes a plurality of stator sections. The plurality of stator sections are retained on the support structure. Each stator may be engaged or disengaged through a control device.

Water is pumped from the body of water with the plurality of water pumps through the plurality of inlet pipes up to the water reservoir. The water in the water reservoir flows down the water channel and causes the plurality of paddle wheels to rotate. The rotating paddle wheels cause the plurality of electrical generators to rotate and generate electricity. The plurality of water pumps may be driven by a wind mill or any other suitable source. Some of the plurality of water pumps may also be driven by a bottom paddle wheel. The tank paddles in each paddle wheel act as a flywheel and increase the torque of each paddle wheel. The individually engagable stators allow the power generation to be varied for a particular application.

Accordingly, it is an object of the present invention to provide a hydroelectric power system, which includes a plurality of paddle wheels driven by water flowing down a water channel.

It is a further object of the present invention to provide a hydroelectric power system, which includes paddle wheels with some of the paddles containing water.

It is finally an object of the present invention to provide a hydroelectric power system, which includes a plurality of generators having a plurality of stator sections that may be individually controlled.

These and additional objects, advantages, features and benefits of the present invention will become apparent from the following specification.

BRIEF DESCRIPTION OF THE DRAWINGS

FIG. 13 is an enlarged perspective view of a paddle wheel with four tank paddles of a hydroelectric power system in accordance with the present invention.

FIG. 14 is an enlarged perspective view of a tank paddle of a paddle wheel of a hydroelectric power system in accordance with the present invention.

DETAILED DESCRIPTION OF THE PREFERRED EMBODIMENTS

Figure 1:
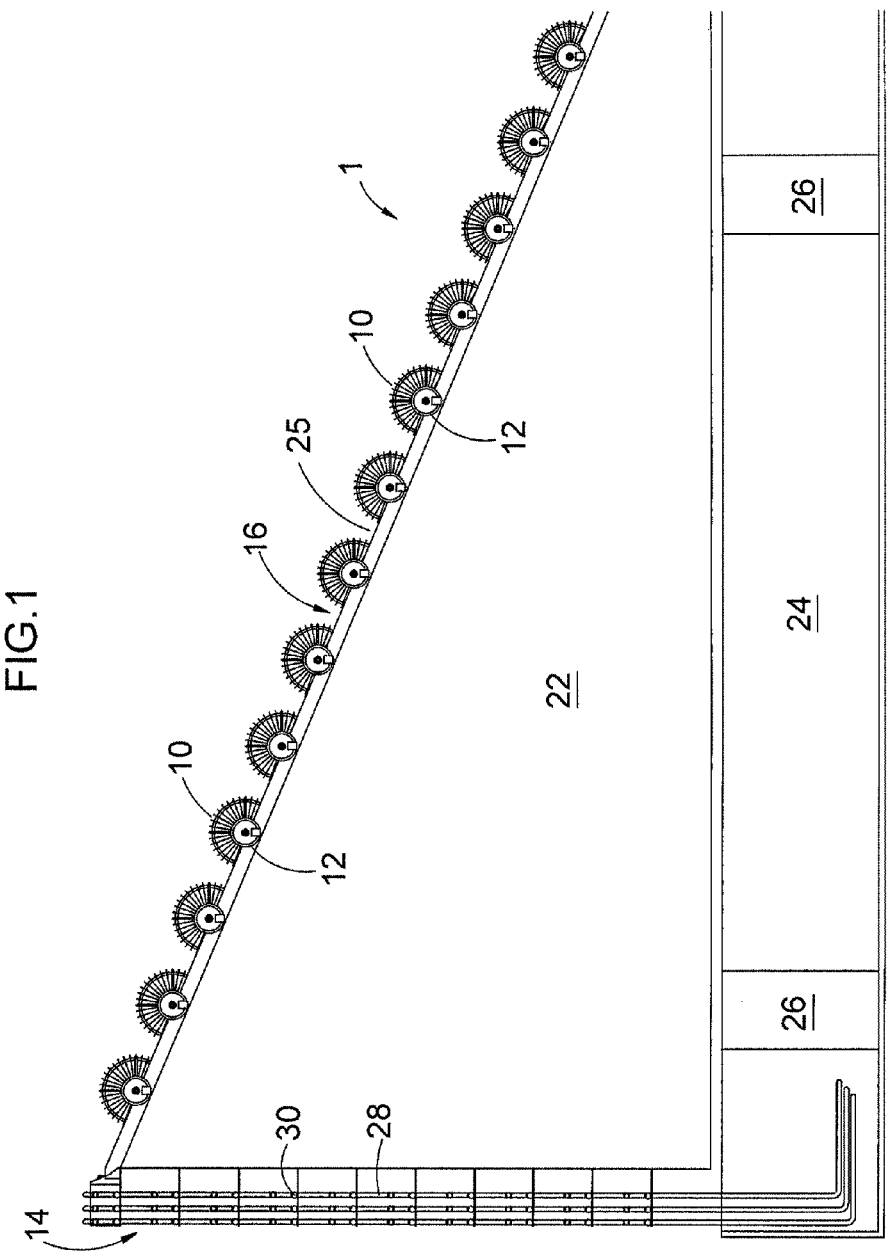
FIG. 1 is a side view of a hydroelectric power system in accordance with the present invention.
Figure 2:
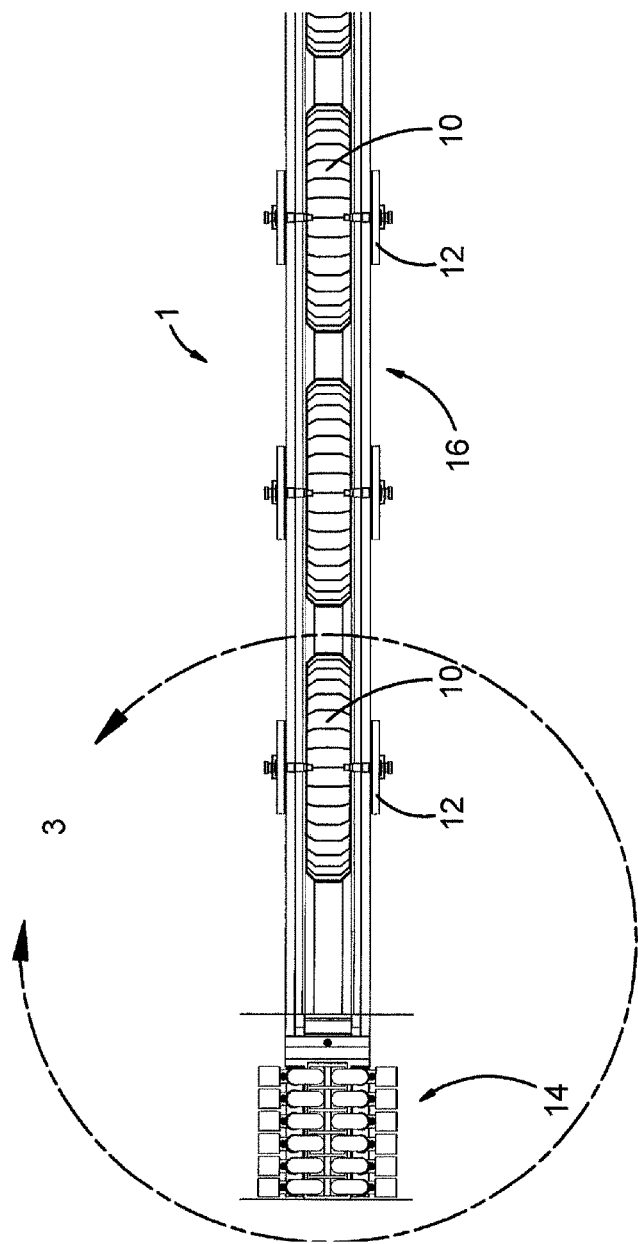
FIG. 2 is a top view of a portion of a hydroelectric power system in accordance with the present invention.
Figure 3:
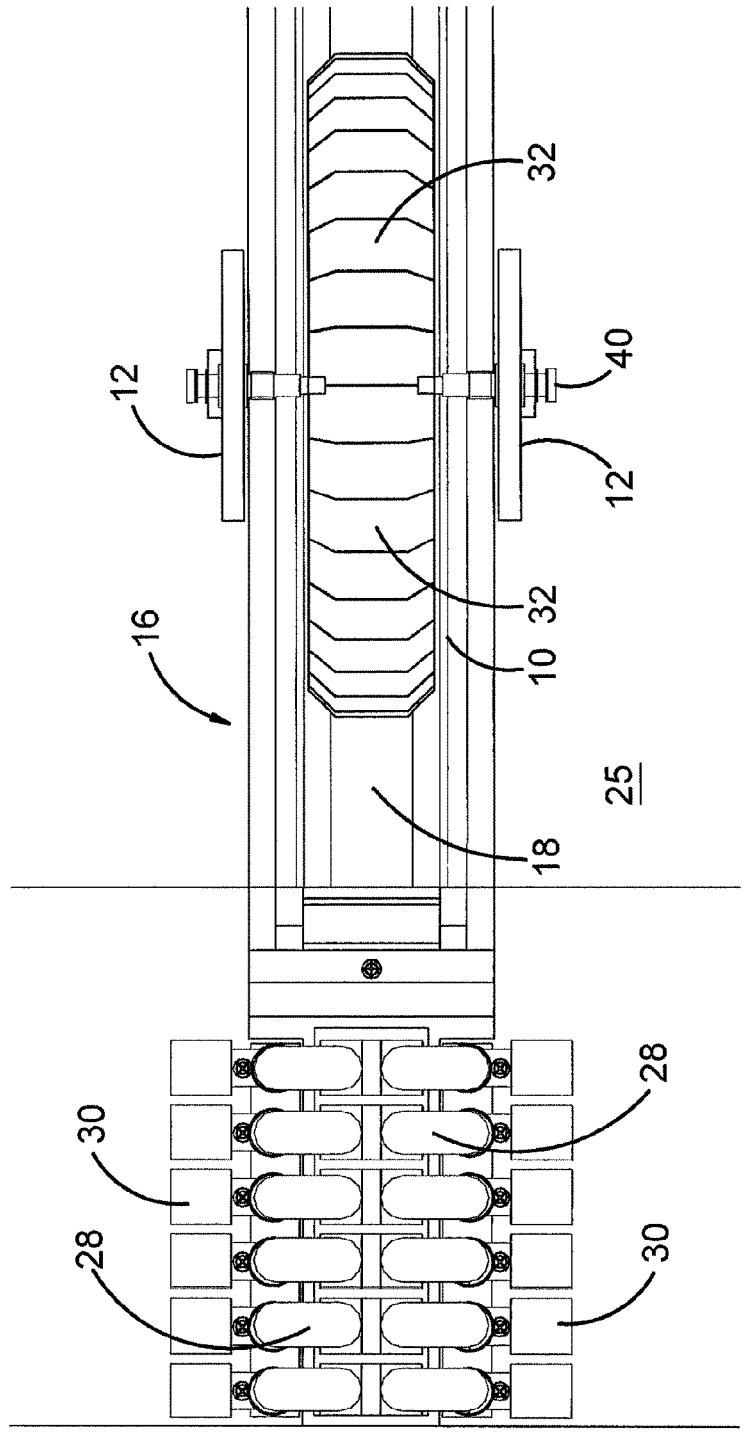
FIG. 3 is an enlarged section of a top view cut through FIG. 2 of a hydroelectric power system in accordance with the present invention.
Figure 4:
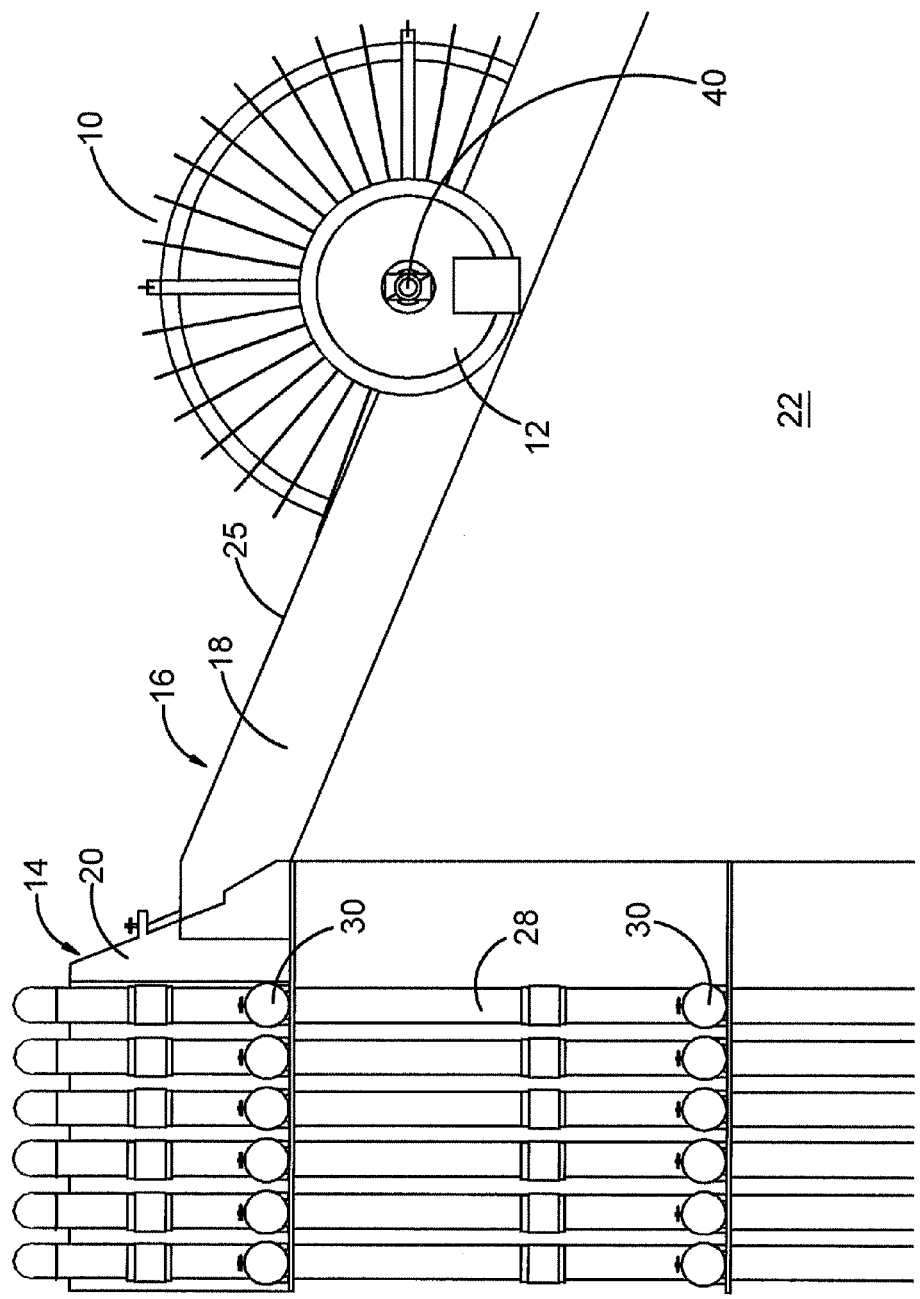
FIG. 4 is an enlarged side view of a portion of a hydroelectric power system in accordance with the present invention.
Figure 5:
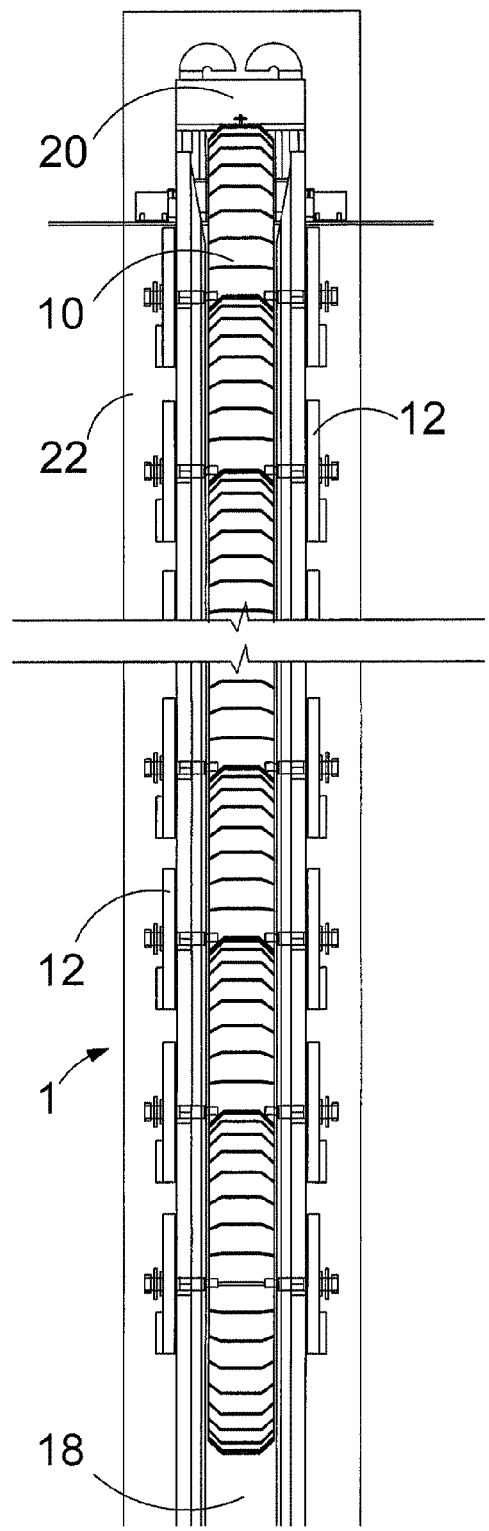
FIG. 5 is a front view of a portion of a hydroelectric power system in accordance with the present invention.
Figure 6:
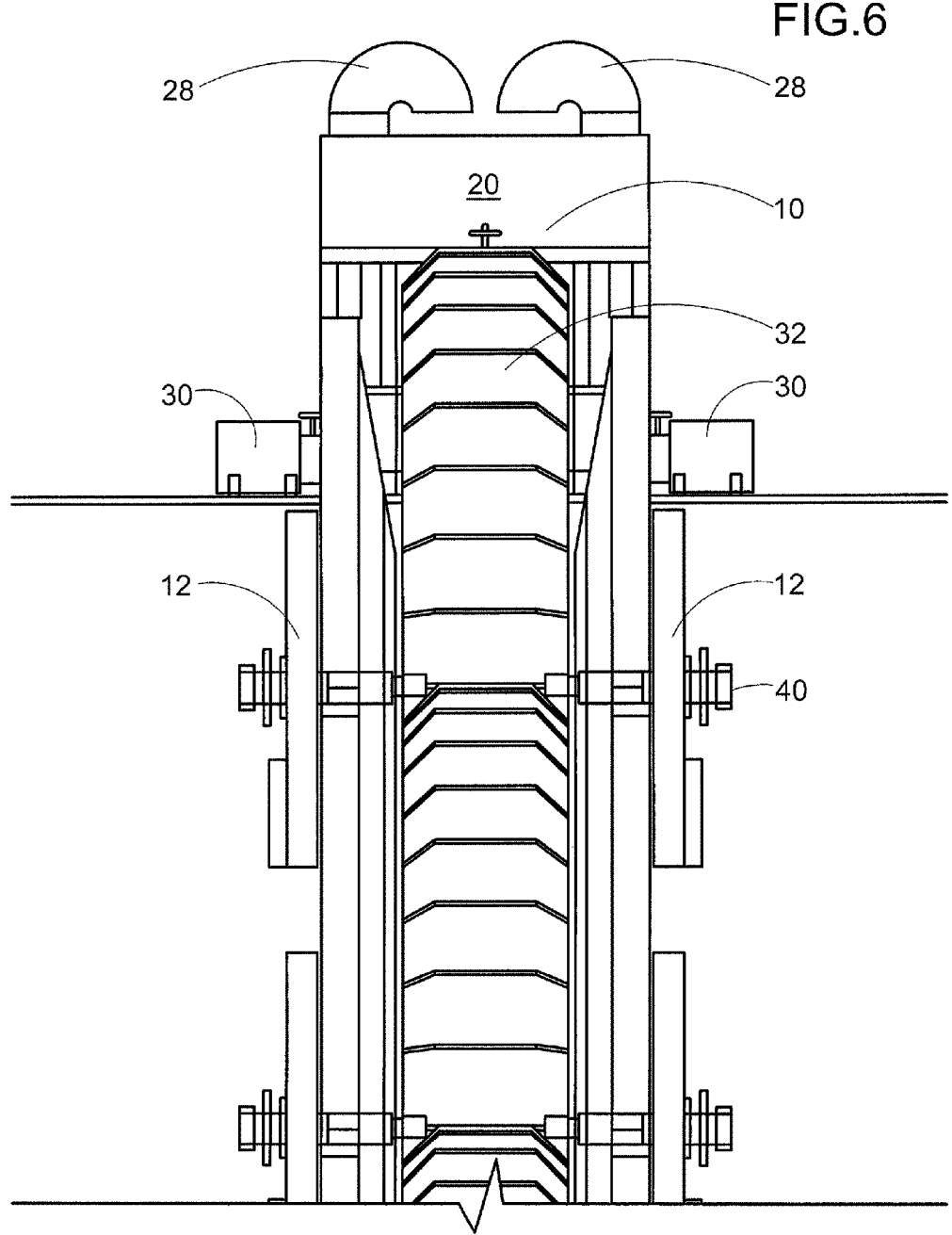
FIG. 6 is an enlarged front view of a portion of a hydroelectric power system in accordance with the present invention.

With reference now to the drawings, and particularly to FIG. 1, there is shown a side view of a hydroelectric power system 1. With reference to FIGS. 2-6, the hydroelectric power system 1 includes a plurality of paddle wheels 10, a plurality of electrical generators 12, a pumping system 14 and a support structure 16. The support structure 16 includes at least one water channel 18, a water reservoir 20 and a support base 22. The support base 22 is located in or above a body of water 24 either natural or man made. The support base 22 may be supported above the body of water with a plurality of support devices 26. The support base 22 includes an inclined surface 25. The at least one water channel 18 is formed in the inclined surface 25. The natural body of water could be a pond, river, lake or ocean. The man made body of water could be a holding tank or a ground reservoir. The pumping system 14 includes a plurality of inlet pipes 28 and water pumps 30. One end of each inlet pipe 28 is located in the body of water 24 and the other end fills the water reservoir 20 with water. The plurality of paddle wheels 10 are rotatably retained along a length of the inclined surface 18.

Figure 7:
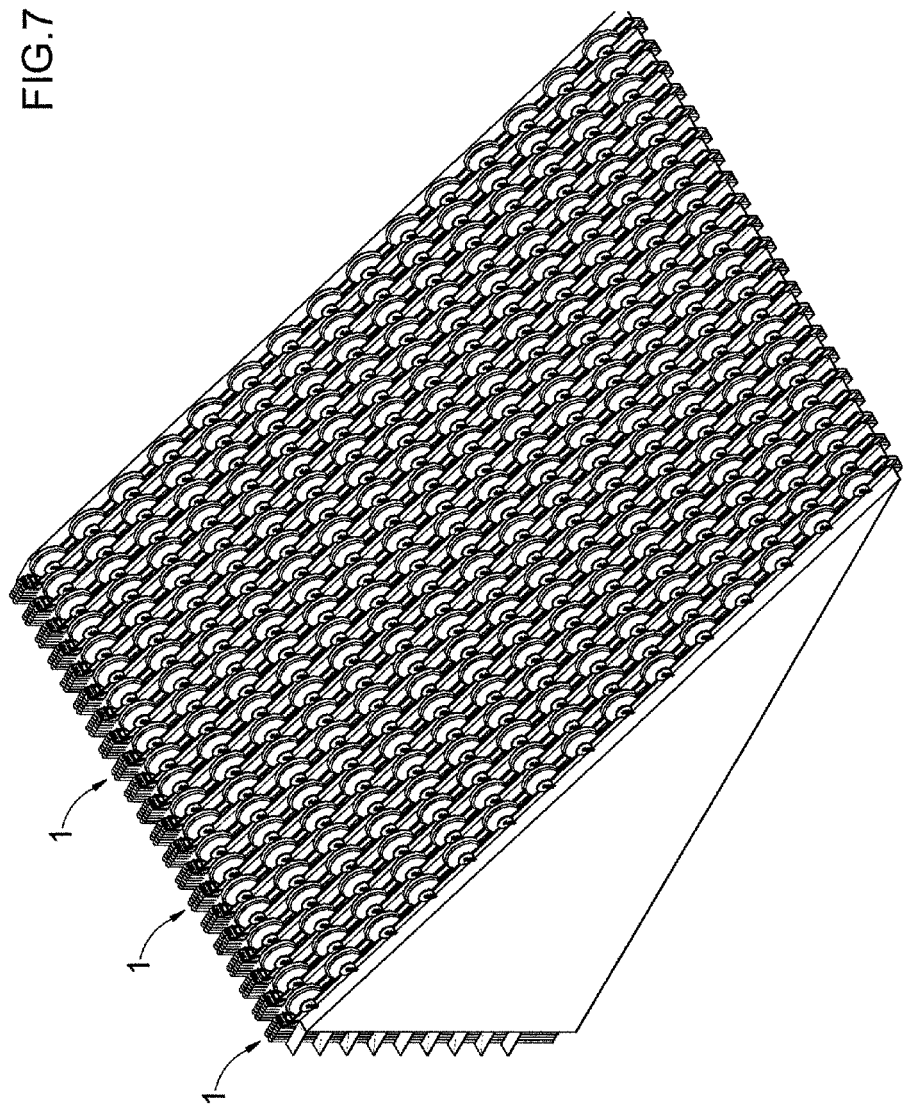
FIG. 7 is a perspective view of a hydroelectric power system with a plurality of parallel paddle wheels in accordance with the present invention.
Figure 8:
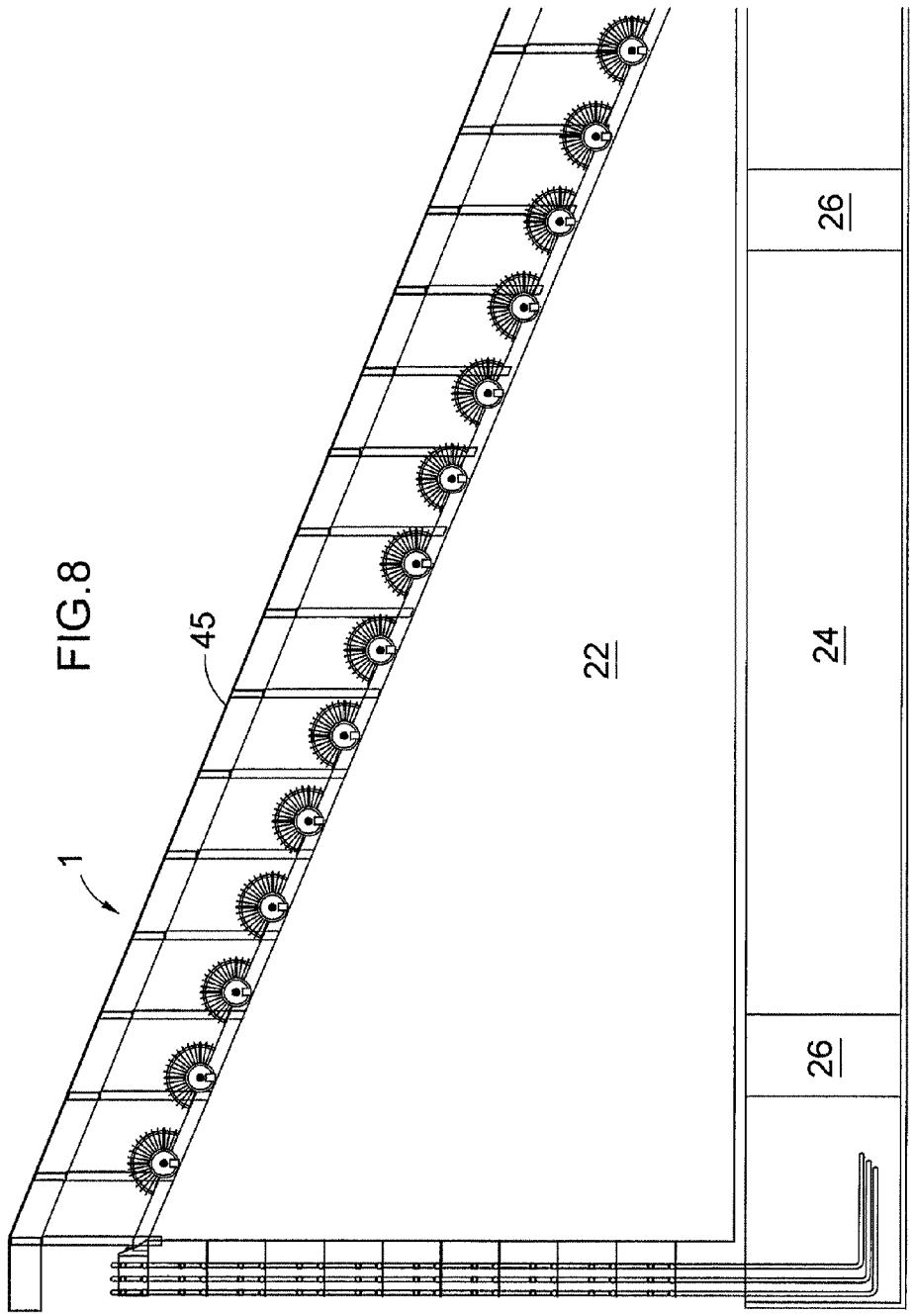
FIG. 8 is a side view of a hydroelectric power system with a roof over a plurality of paddle wheels in accordance with the present invention.

With reference to FIGS. 13-14, each paddle wheel 10 includes a plurality of paddles 32, 36 extending radially from a paddle hub 34. Each tank paddle 36 includes a plurality of water tanks 38, 39. The plurality of water tanks 38, 39 are attached to each other. Preferably, one half of each water tank 38, 39 is filled with water and the other half is filled with compressed air. An end portion of the water tanks are filled with water. A paddle axle 40 extends from the paddle hub 34. The paddle axle 40 is rotatably retained on each end by the support base 22. With reference to FIG. 7, a plurality of hydroelectric power systems 1 are arranged in parallel. With reference to FIG. 8, a roof 45 is retained over the hydroelectric power system 1.

Figure 11:
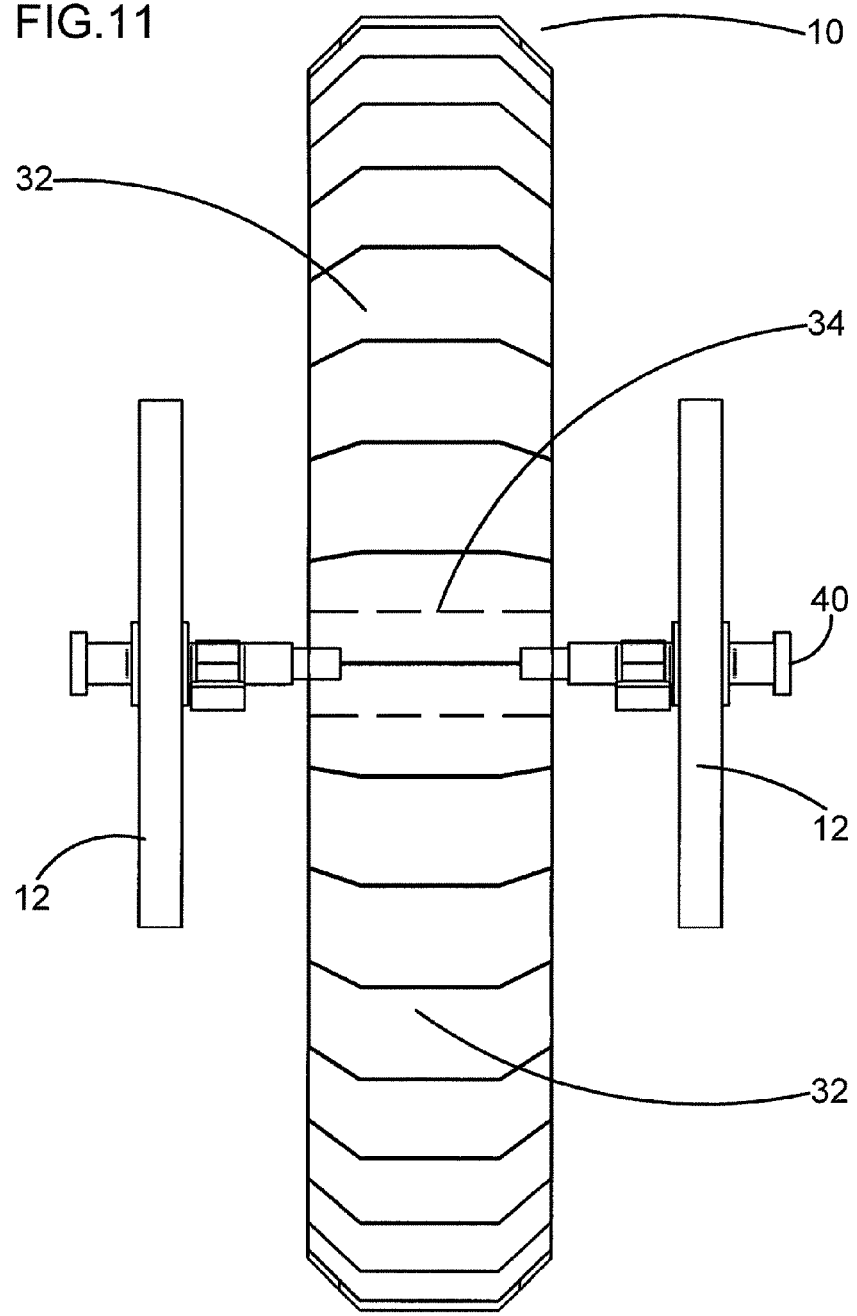
FIG. 11 is an enlarged front view of a paddle wheel with two electrical generators retained on a paddle axle thereof of a hydroelectric power system in accordance with the present invention.
Figure 12:
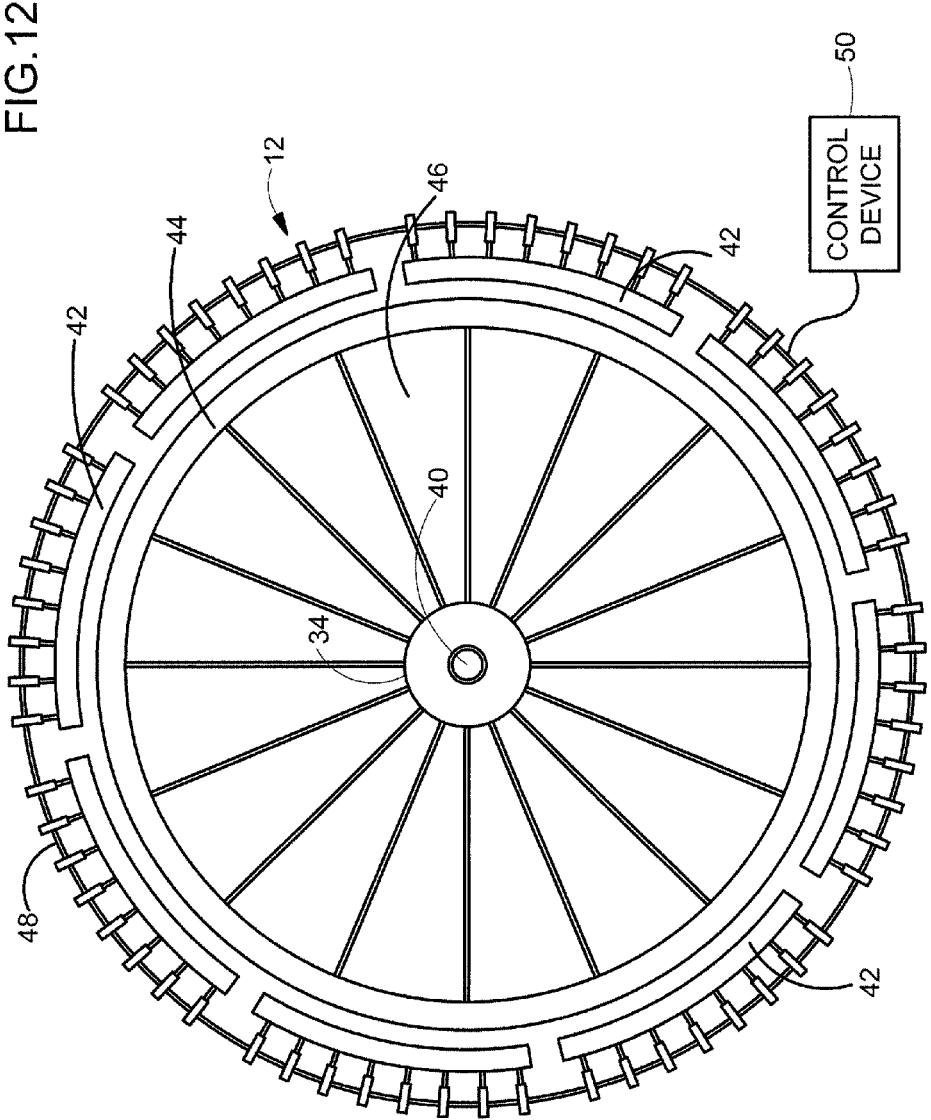
FIG. 12 is an enlarged side view of an electrical generator retained on a paddle axle of a paddle wheel of a hydroelectric power system in accordance with the present invention.

With reference to FIG. 11, the paddle axle 40 of each paddle wheel 10 drives at least one electrical generator 12. With reference to FIG. 12, each electrical generator 12 includes a plurality of stator sections 42, a rotor 44, a rotor support structure 46 and a stator support structure 48. The rotor 44 is retained on the rotor support structure 46 and the rotor support structure 46 is attached to the paddle axle 40. The plurality of stator sections 42 are retained by the stator support structure 48 and the stator support structure 48 is secured to each side of the support base 22. Each one of the plurality of stator sections 42 is engaged or disengaged through a control device 50. The control device 50 is preferably a microprocessor or microcontroller based control device.

Water is pumped from the body of water 24 with the plurality of water pumps 30 through the plurality of inlet pipes 28 up to the water reservoir 20. The water in the water reservoir 20 flows down the water channel 18 and causes the plurality of paddle wheels 12 to rotate. The rotating paddle wheels 10 cause the plurality of electrical generators 12 to rotate and generate electricity. The plurality of water pumps may be driven by a wind mill or any other suitable source.

Figure 9:
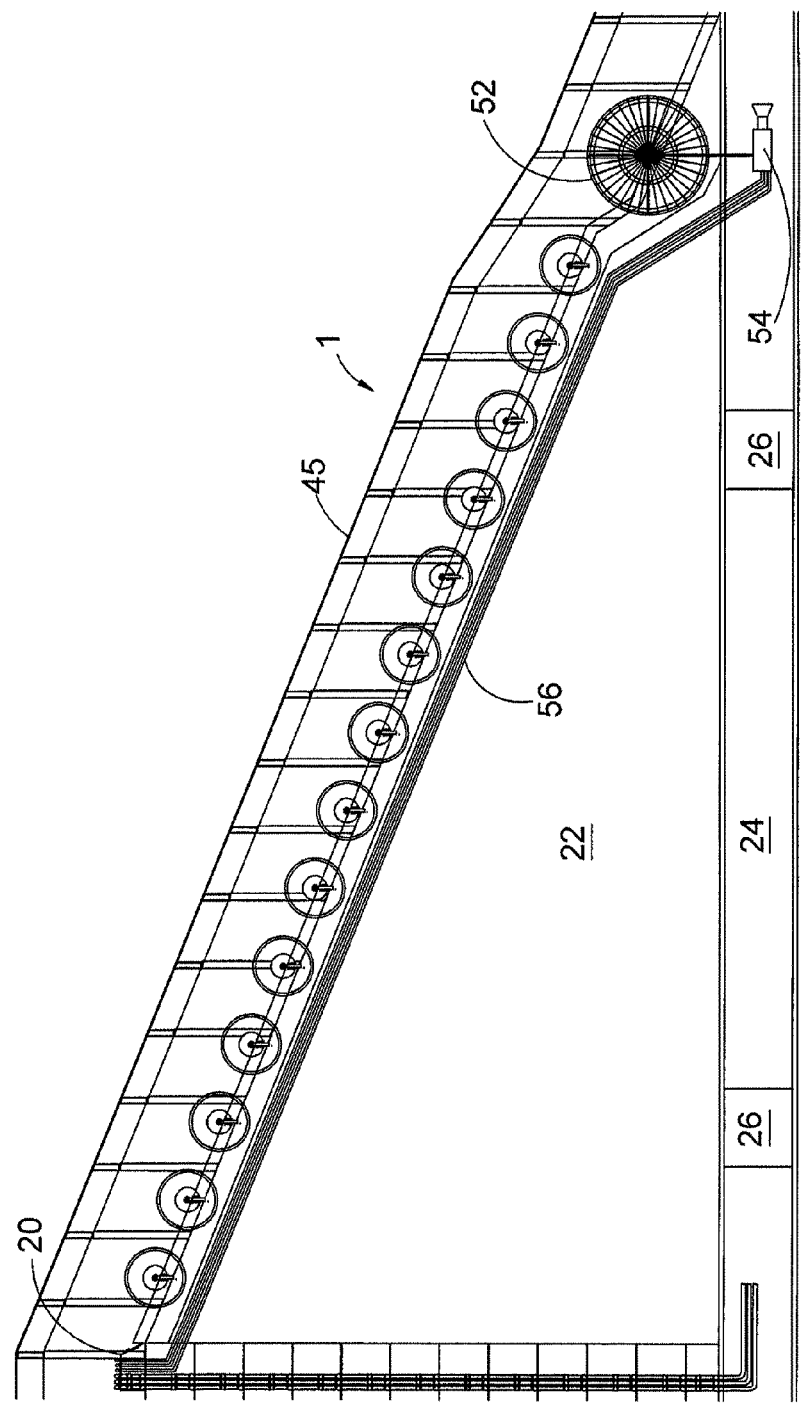
FIG. 9 is a side view of a hydroelectric power system with a bottom paddle wheel that powers at least one water pump in accordance with the present invention.
Figure 10:
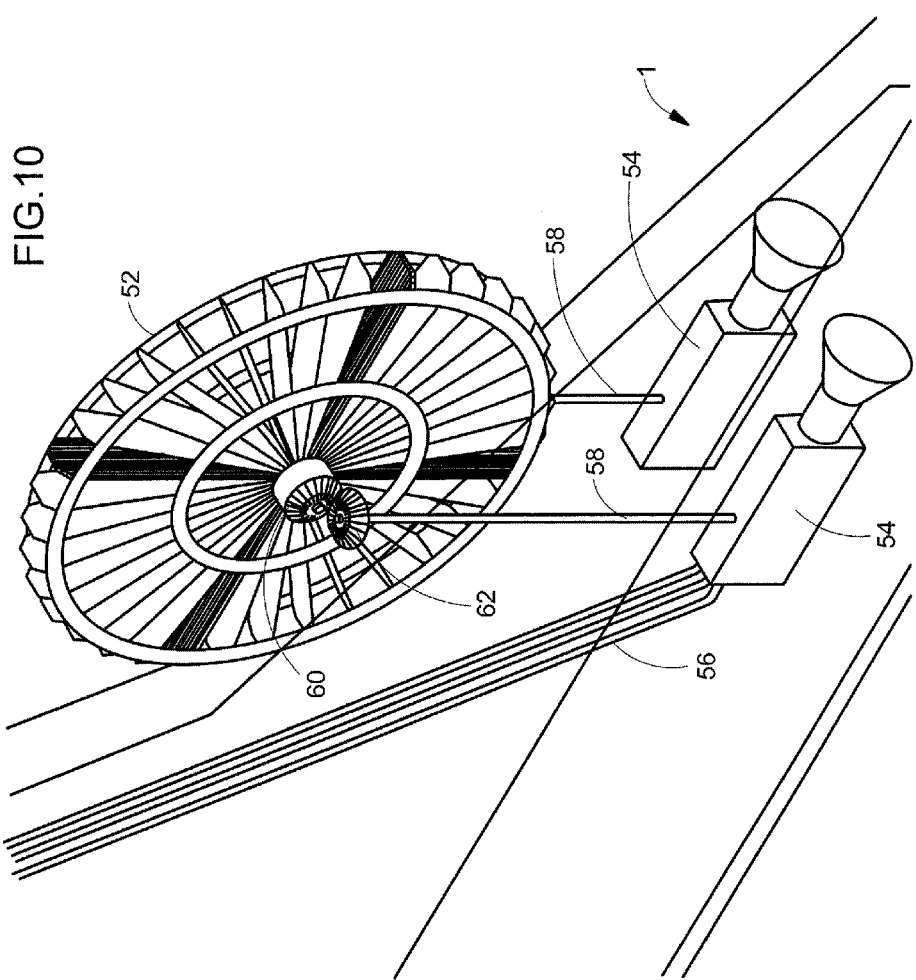
FIG. 10 is an enlarged perspective view of a bottom paddle wheel that powers at least one water pump of a hydroelectric power system in accordance with the present invention.

With reference to FIGS. 9-10, some of the plurality of water pumps may also be driven by a bottom paddle wheel 52. The bottom paddle wheel 52 may also drive at least one water pump 54, which pumps water to the water reservoir 20 through a plurality of inlet pipes 56. The water pumps 54 are preferably driven through a drive shaft 58, a drive gear 60 and a driven gear 62. The paddle tanks 38, 39 in each paddle wheel 10, 52 act as a flywheel and increase the torque of each paddle wheel 10, 52. The individually engagable stators 42 allow the power generation to be varied for a particular application.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A hydroelectric power system comprising:
   a support structure including an inclined surface, at least one water channel being formed in said inclined surface;
   a source of water being located below a top of said inclined surface;
   at least one pumping system for the transfer of water from said source of water to said top of said inclined surface;
   a plurality of paddle wheels being rotatably retained along a length of said inclined surface, each one of said plurality of paddle wheels including a plurality of paddles and a paddle axle, a portion of said plurality of paddle wheels being disposed in said at least one water channel;
   at least one of said plurality of paddles being a tank paddle, said tank paddle including a hollow space for the retention of a flowable substance;
   a plurality of electrical generators, each one of said electrical generators including a rotor and a plurality of stator sections, said rotor being retained on said paddle axle; and
   a control device engaging and disengaging said plurality of stator sections.

2. The hydroelectric power system of claim 1, further comprising:
   water flows in said at least one water channel from said top of said inclined surface to a bottom of said inclined surface.

3. The hydroelectric power system of claim 1, further comprising:
   said pumping system including a plurality of inlet pipes and a plurality of water pumps, said plurality of water pumps pumping water in said plurality of inlet pipes.

4. The hydroelectric power system of claim 1, further comprising:
   at least one paddle wheel driving at least one water pump.

5. The hydroelectric power system of claim 1, further comprising:
   a water reservoir being located on a top of said inclined surface for retaining water.

6. The hydroelectric power system of claim 1, further comprising:
   each one of said plurality of paddles wheels including said plurality of paddles extending from a paddle hub, said paddle axle extending from each end of said paddle hub.

7. The hydroelectric power system of claim 1, further comprising:
   each one of said plurality of generators including said plurality of stator sections, said rotor, a rotor support structure and a stator support structure, said stator support structure retaining said plurality of stator sections, said rotor support structure retaining said rotor, said rotor support structure being retained on said paddle axle, said stator support structure being retained on said support structure.

8. A hydroelectric power system comprising:
   a support structure including an inclined surface, at least one water channel being formed in said inclined surface, water flows in said at least one water channel from a top of said inclined surface to a bottom of said inclined surface;
   a source of water being located below a top of said inclined surface;
   at least one pumping system for the transfer of water from said source of water to a top of said inclined surface;

a plurality of paddle wheels being rotatably retained along a length of said inclined surface, each one of said plurality of paddle wheels including a plurality of paddles and a paddle axle, a portion of said plurality of paddle wheels being disposed in said at least one water channel;

at least one of said plurality of paddles being a tank paddle, said tank paddle including a hollow space for the retention of a flowable substance;

a plurality of electrical generators, each one of said electrical generators including a rotor and a plurality of stator sections, said rotor being retained on said paddle axle.

9. The hydroelectric power system of claim 8, further comprising:

said pumping system including a plurality of inlet pipes and a plurality of water pumps, said plurality of water pumps pumping water in said plurality of inlet pipes.

10. The hydroelectric power system of claim 8, further comprising:

at least one paddle wheel driving at least one water pump.

11. The hydroelectric power system of claim 8, further comprising:

a water reservoir being located on a top of said inclined surface for retaining water.

12. The hydroelectric power system of claim 8, further comprising:

each one of said plurality of paddles wheels including said plurality of paddles extending from a paddle hub, said paddle axle extending from each end of said paddle hub.

13. The hydroelectric power system of claim 8, further comprising:

each one of said plurality of generators including said plurality of stator sections, said rotor, a rotor support structure and a stator support structure, said stator support structure retaining said plurality of stator sections, said rotor support structure retaining said rotor, said rotor support structure being retained on said paddle axle, said stator support structure being retained on said support structure.

14. A hydroelectric power system comprising:

a support structure including an inclined surface, at least one water channel being formed in said inclined surface;

a source of water being located below a top of said inclined surface;

at least one pumping system for the transfer of water from said source of water to said top of said inclined surface;

a plurality of paddle wheels being rotatably retained along a length of said inclined surface, each one of said plurality of paddle wheels including a plurality of paddles and a paddle axle, a portion of said plurality of paddle wheels being disposed in said at least one water channel;

at least one of said plurality of paddles being a tank paddle, said tank paddle including a hollow space for the retention of a flowable substance; and at least one electrical generator, each one of said at least one electrical generator includes a rotor and at least one stator.

15. The hydroelectric power system of claim 14, further comprising:

water flows in said at least one water channel from said top of said inclined surface to a bottom of said inclined surface.

16. The hydroelectric power system of claim 14, further comprising:

each one of said plurality of paddles wheels including said plurality of paddles extending from a paddle hub, said paddle axle extending from each end of said paddle hub.

* * * * *